(12) United States Patent
Spirtus et al.

(10) Patent No.: US 10,581,515 B2
(45) Date of Patent: Mar. 3, 2020

(54) METHOD FOR CALIBRATING AND COMMISSIONING COMMUNICATION SATELLITES USING LEO SATELLITES

(71) Applicant: NSL COMM LTD, Airport (IL)

(72) Inventors: Daniel Spirtus, Holon (IL); Raz Itzhaki-Tamir, Rishon Le-Zion (IL); Daniel Rockberger, Ra'anana (IL)

(73) Assignee: NSL COMM LTD, Airport (IL)

( * ) Notice: Subject to any disclaimer, the term of this patent is extended or adjusted under 35 U.S.C. 154(b) by 0 days.

(21) Appl. No.: 16/326,925

(22) PCT Filed: Aug. 21, 2017

(86) PCT No.: PCT/IL2017/050929
§ 371 (c)(1),
(2) Date: Feb. 21, 2019

(87) PCT Pub. No.: WO2018/037404
PCT Pub. Date: Mar. 1, 2018

(65) Prior Publication Data
US 2019/0181945 A1    Jun. 13, 2019

Related U.S. Application Data

(60) Provisional application No. 62/377,623, filed on Aug. 21, 2016.

(51) Int. Cl.
*H04B 7/185*  (2006.01)
*H04B 7/195*  (2006.01)
(Continued)

(52) U.S. Cl.
CPC ..... *H04B 7/18519* (2013.01); *H04B 7/18513* (2013.01); *H04B 7/18543* (2013.01);
(Continued)

(58) Field of Classification Search
CPC ............... H04B 7/195; H04B 7/18513; H04B 7/18519; H04B 7/19; H04B 7/185; H04B 17/14; H04B 7/18543; H04B 7/18556
See application file for complete search history.

(56) References Cited

U.S. PATENT DOCUMENTS 6,023,605 A    2/2000 Sasaki et al.
6,102,335 A    8/2000 Castiel et al.
(Continued)

OTHER PUBLICATIONS

Search Report of International Application No. PCT/IL2017/050929 dated Dec. 21, 2017.

*Primary Examiner* — Keith Ferguson
(74) *Attorney, Agent, or Firm* — Pearl Cohen Zedek Latzer Baratz LLP

(57) ABSTRACT

Generally, system and method for calibration an in-orbit satellite are provided. The method may comprise transmitting, by a Geosynchronous (GEO) satellite, a GEO satellite signal and receiving, by a Low Earth Orbiting (LEO) satellite, the GEO satellite signal when the LEO satellite crosses a predetermined transmission footprint of the GEO satellite at a predetermined LEO satellite location. The method may comprise determining, by a base station, a GEO satellite location at which the GEO satellite signal is received by the LEO satellite. The method may comprise comparing, by the base station, the transmitted GEO satellite signal and the received GEO satellite signal and further determining, by the base station, based on at least one of the comparison thereof, the predetermined LEO satellite location and the GEO satellite location, a GEO satellite transmission performance at a specific geographical location on ground.

14 Claims, 6 Drawing Sheets

(51) Int. Cl.
*H04B 17/14* (2015.01)
*H04B 7/19* (2006.01)

(52) U.S. Cl.
CPC ........... *H04B 7/18556* (2013.01); *H04B 7/19* (2013.01); *H04B 7/195* (2013.01); *H04B 17/14* (2015.01)

(56) References Cited

U.S. PATENT DOCUMENTS

2014/0128059 A1   5/2014  Tronc et al.
2015/0381267 A1  12/2015  Tronc
2018/0343055 A1* 11/2018  Olson .................... B64G 1/10

\* cited by examiner

METHOD FOR CALIBRATING AND COMMISSIONING COMMUNICATION SATELLITES USING LEO SATELLITES

CROSS-REFERENCE TO RELATED APPLICATIONS

This application is a National Phase Application of PCT International Application No. PCT/IL2017/050929, International Filing Date Aug. 21, 2017, entitled "Method for Calibrating and Commissioning Communication Satellites Using Leo Satellites", published on Mar. 1, 2018 as International Patent Application Publication No. WO 2018/037404, claiming the benefit of U.S. Provisional Patent Application No. 62/377,623, filed Aug. 21, 2016, which is incorporated herein by reference in its entirety.

FIELD OF THE INVENTION

The present invention relates to the field of communication satellites, and more particularly, to systems and methods for calibration of communication satellites.

BACKGROUND OF THE INVENTION

Current calibration of geosynchronous (GEO) satellites is typically done on the earth's surface/ground, for example by terrestrial receivers (deployed on the ground within transmission footprint of the GEO satellite) that are used to measure GEO satellite signal parameters (e.g., strength and quality) as received from the being calibrated GEO satellite. In some cases, receivers are mounted on vehicles to provide a geographical measurement of the power. However, current calibration methods suffer from uncertainties caused by, for example, varying atmospheric conditions in a medium between the calibrated GEO satellite and the receivers. For example, fading due to rain in the area where the transmission footprint is measured causes uncertainties in the received power, and it may be hard to tell whether the fading is due to environmental conditions or degrading in the satellite's performance. In many cases measurement of transmission performance of a satellite is hard to be carried out for, example when the transmission footprint is on an undeveloped area with uneasy access. The present invention provides an accurate and easy to perform method and system for calibrating in-orbit satellites (such as GEO satellite), which is free of such disadvantages.

Other difficulties arise from the need to find a suitable test range on ground (hundreds of kilometers between possible measurement locations).

SUMMARY OF THE INVENTION

One aspect of the present invention provides a system for calibrating an in-orbit satellite, the system comprising: a Geosynchronous (GEO) satellite orbiting in a predetermined GEO orbit and having a predetermined transmission footprint, the GEO satellite is arranged to transmit a GEO satellite signal having predetermined transmitted GEO satellite signal parameters; a Low Earth Orbiting (LEO) satellite orbiting in a predetermined LEO orbit that crosses the predetermined transmission footprint of the GEO satellite, the LEO satellite is arranged to receive the GEO satellite signal when it crosses the predetermined transmission footprint of the GEO satellite at a predetermined LEO satellite location and to transmit a LEO satellite signal comprising the received GEO satellite signal having specified received GEO satellite signal parameters; and a control station arranged to receive the LEO satellite signal from the LEO satellite and comprising a processing unit arranged to: determine a GEO satellite location at which the GEO satellite signal is received by the LEO satellite; compare the predetermined transmitted GEO satellite signal parameters and the specified received GEO satellite signal parameters; and determine, based on at least one of the comparison thereof, the GEO location and the predetermined LEO location, a GEO satellite transmission performance at a specific geographical location on ground.

Another aspect of the present invention provides a method of calibrating an in-orbit satellite, the method comprising: transmitting, by a Geosynchronous (GEO) satellite, a GEO satellite signal having predetermined transmitted GEO satellite signal parameters; receiving, by a Low Earth Orbiting (LEO) satellite, the GEO satellite signal when the LEO satellite crosses a predetermined transmission footprint of the GEO satellite at a predetermined LEO satellite location, and transmitting, by the LEO satellite, a LEO satellite signal comprising the received GEO satellite signal having specified received GEO satellite signal parameters; receiving, by a base station, the LEO satellite signal; determining, by the base station, a GEO satellite location at which the GEO satellite signal is received by the LEO satellite; comparing, by the base station, the predetermined transmitted GEO satellite signal parameters and the specified received GEO satellite signal parameters; and determining, based on at least one of the comparison thereof, the LEO satellite location and the GEO satellite location, a GEO satellite transmission performance at a specific geographical location on ground.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1A:
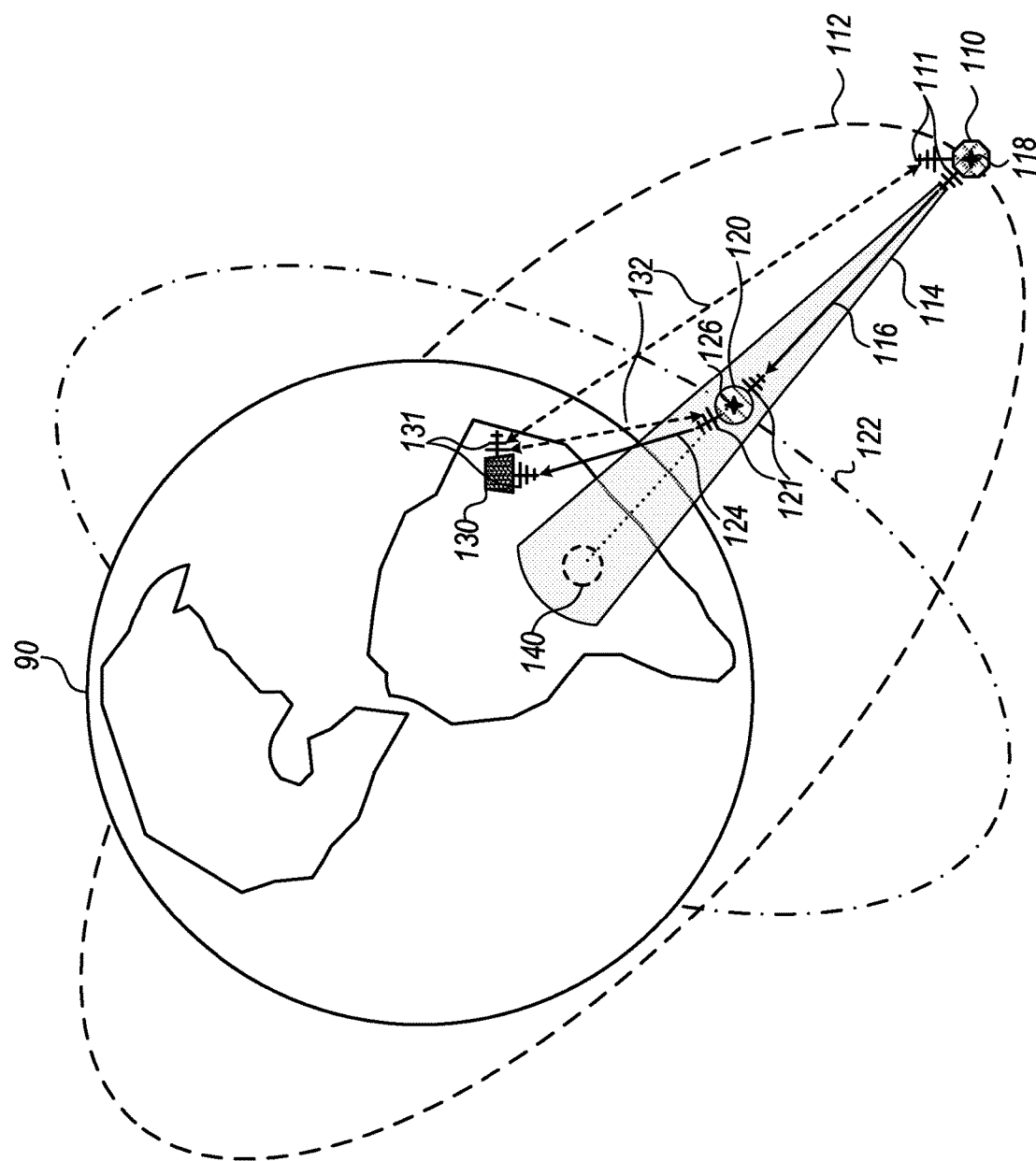
FIG. 1A is a schematic illustration of a system for calibrating an in-orbit satellite, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Generally, system and method for calibration an in-orbit satellite are provided. The method may comprise transmitting, by a Geosynchronous (GEO) satellite, a GEO satellite signal and receiving, by a Low Earth Orbiting (LEO) satellite, the GEO satellite signal when the LEO satellite crosses a predetermined transmission footprint of the GEO satellite at a predetermined LEO satellite location on a determined LEO orbit. This solution has many benefits. First the medium between the GEO satellite and the crossing LEO satellite is substantially free of meteorological disturbances. Second locating the measuring LEO satellite is free of topographic hardships, thus enabling locating the LEO satellite at a desired measurement location. Third, the LEO constellation can be tuned to have optimal crossing of the GEO satellite footprint. Fourth, a single LEO constellation can be used to calibrate multiple GEO satellites, and the process can be repeated multiple times during the operational life of the GEO satellites. Further, the measurement added payload for carrying the required activities involved with the GEO measurements may be of negligible percentage of the total weight of the LEO satellite, yet it may be used for the purposes described herein and thereby to increase the value of the LEO satellite.

The method may comprise determining, by a base station, a GEO satellite location at which the GEO satellite signal is received by the LEO satellite. The method may comprise comparing, by the base station, the transmitted GEO satellite signal and the received GEO satellite signal and further determining, by the base station, based on at least one of the comparison thereof, the predetermined LEO satellite location and the GEO satellite location, a GEO satellite transmission performance at the LEO satellite and deducing the GEO satellite transmission performance at a specific geographical location on ground.

In the description below where base station is mentioned it should be apparent to those skilled in the art in order to perform the processes described according to embodiments of the invention more than one base station may be involved. For example, a GEO satellite may be in active communication with a first base station and a LEO satellite involved in the measuring and tuning of the GEO satellite may be in active communication with another base station. In other or additional instances the LEO satellite may connect a base station in time period different than the time period at which the LEO satellite received the transmission from the measured/tuned GEO satellite. For example, in such cases the parameters of the GEO transmission as received by the LEO satellite may be recorded and stored for being transmitted at a later time to a respective base station. In cases where the measured GEO satellite communicates with a first base station and the LEO satellite that receives its transmissions communicates, or will communicate at a later time, with a second base station, the respective data may be transmitted from the second base station to the first base station, in order to enable completion of the tuning process. In the description of embodiments of the invention below and the respective drawings only one base station is mentioned however it will be apparent to those skilled in the art that two or more base stations may be part of the system described and may be involved in the operation described below, as the case may be. It would be understood that one or more base stations are represented by the base station described and illustrated, according to the lines drawn above.

Reference is now made to FIG. 1A, which schematically illustrates a system 100 for calibrating an in-orbit satellite, according to some embodiments of the invention.

According to various embodiments, system 100 may comprise a Geosynchronous (GEO) satellite 110 (e.g., a communication satellite) orbiting in a predetermined GEO orbit 112 and having a predetermined transmission footprint 114 (e.g., an area covered by its transponder), a Low Earth Orbiting (LEO) satellite 120 orbiting in a predetermined LEO orbit 122 that crosses predetermined transmission footprint 114 of GEO satellite 110 and/or a base station 130 in communication with GEO satellite 110 and LEO satellite 120 (e.g., as indicated by dashed arrows 132 in FIG. 1A). In some embodiments, base station 130 may be located at a predetermined location on ground 90.

GEO satellite 110 may be arranged to transmit (e.g., by at least one antenna 111) a GEO satellite signal 116. GEO satellite signal 116 may have predetermined transmitted GEO satellite signal parameters. In some embodiments, the predetermined transmitted GEO satellite signal parameters may comprise at least one of a strength, frequency, polarization and/or modulation of the signal thereof.

LEO satellite 120 may be arranged to receive (e.g., by at least one antenna 121 facing GEO satellite 110) GEO satellite signal 116 when LEO satellite 120 crosses predetermined transmission footprint 114 of GEO satellite 110 at a predetermined LEO satellite location 126. LEO satellite 120 may be further arranged to generate and transmit (e.g., by at least one antenna 121) a LEO satellite signal 124. In some embodiments, LEO satellite signal 124 may comprise the received GEO satellite signal 116. LEO satellite may, according to some embodiments, record, save or otherwise accumulate the signal power measurements of the GEO transmission, along with time stamp and location (based on, for example, a GPS signal), and may transmit the saved records to the base station servicing the GEO satellite, for example directly or via another base station. In some embodiments, the LEO satellite may perform some analysis of the received transmission from the measured GEO satellite.

The received GEO satellite signal 116 may have specified received GEO satellite signal parameters. In some embodiments, the specified received GEO satellite signal parameters may comprise at least one of a strength, frequency, polarization and/or modulation of GEO satellite signal 116 received by LEO satellite 120. In some embodiments, at least a portion of the transmitted GEO satellite signal parameters may differ from corresponding specified received GEO satellite signal parameters. The difference thereof may be due to, for example, attitude errors in the satellite pointing algorithm, inaccuracies of sensors or actuators of the GEO satellite, as well as problems in the antenna mechanism of the GEO satellite.

System 100 comprises a computer, controller or similar computing machine that adapted to execute computer programs (not shown). The computer may be, for example, part of base station 130. The computer may be in active communication with a memory unit and a storage device (not shown), where computer programs may be stored as well as data and computing results. At least one of the memory unit and the storage device may be, or may have non-transitory memory for holding and keeping data and programs code, e.g. programs that when executed perform the processes described herein.

Figure 1B:
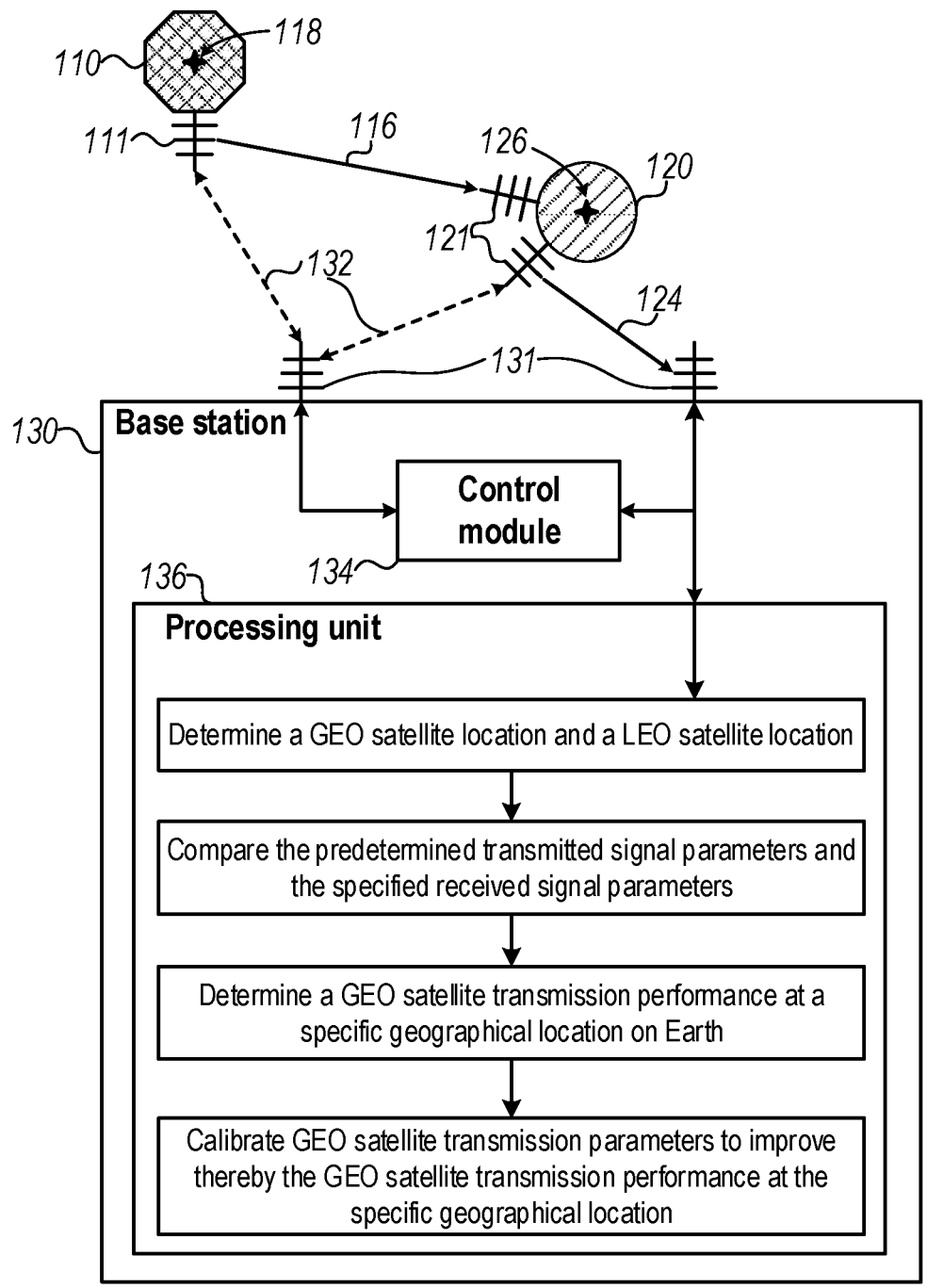
FIG. 1B is a schematic block diagram of functions performed by a base station of the system for calibrating a communication satellite, according to some embodiments of the invention.

Reference is now made to FIG. 1B, which schematically illustrates a block diagram of functions performed by a base station 130 of system 100 for calibrating a communication satellite, according to some embodiments of the invention.

Base station 130 may comprise a control module 134. Control module 134 may be arranged to control GEO satellite 110 and/or LEO satellite 120. For example, base station 130 may be arranged to control GEO satellite 110 and LEO satellite 120 to transmit and receive, respectively, GEO satellite signal 116 when LEO satellite 120 crosses predetermined footprint 114 of GEO satellite 110 at predetermined LEO satellite location 126. In some embodiments, control module 134 may be arranged to determine the transmitted GEO satellite signal parameters. In various embodiments, control module 140 may be arranged to monitor real-time locations of GEO satellite 110 and/or of LEO satellite 120.

In some embodiments, control module 134 may be arranged to adjust the predetermined transmitted GEO satellite signal parameters to, for example, allow its reception by LEO satellite 120. In some embodiments, control module 140 may be further arranged to adjust LEO satellite 120 (e.g., using a software-defined radio (SDR)), based on the predetermined transmitted GEO satellite signal parameters, to enable the reception of transmitted GEO satellite signal 116 by LEO satellite 120.

Base station 130 may be arranged to receive (e.g., by at least one antenna 131), from LEO satellite 120, LEO satellite signal 124. LEO satellite signal 124 may comprise the received GEO satellite signal 116 having the specified received GEO satellite signal parameters (e.g., as described above with respect to FIG. 1A). The received GEO satellite signal 116 may be received by LEO satellite 120 when it crosses predetermined transmission footprint 114 of GEO satellite 110 at predetermined LEO satellite location 126 (e.g., as described above with respect to FIG. 1A).

Base station 130 may comprise a processing unit 136. Processing unit 136 may be arranged to determine a GEO satellite location 118 at which GEO satellite signal 116 is received by LEO satellite 120. In some embodiments, GEO location 118 may be determined (e.g., by processing unit 136) based on information concerning the real-time locations of GEO satellite 110 (e.g., monitored by control module 134). Alternatively or complementarily, GEO satellite signal 116 and/or LEO satellite signal 124 may comprise information regarding GEO satellite location 118 and GEO location 118 may be thereby determined (e.g., by processing unit 136) based on GEO satellite signal 116 and/or LEO satellite signal 124.

Processing unit 136 may be further arranged to compare the predetermined transmitted GEO satellite signal parameters and the specified received GEO satellite signal parameters. In some embodiments, the predetermined transmitted GEO satellite signal parameters may differ from the specified received GEO satellite signal parameters as described (e.g., as described above with respect to FIG. 1A).

Processing unit 136 may be further arranged to determine, based on at least one of the comparison thereof (e.g., of the predetermined transmitted GEO satellite signal parameters and the specified received GEO satellite signal parameters), GEO and predetermined LEO satellite locations 118, 126 (e.g., at which GEO satellite signal 116 is received by LEO satellite 120), a GEO satellite transmission performance at a specific geographical location 140 (e.g. as shown in FIG. 1A) on ground 90. The GEO satellite transmission performance may comprise, for example, a gain of GEO satellite 110 signals received at specific geographical location 140 on ground 90.

Processing unit 136 may be further arranged to calibrate GEO satellite transmission parameters (e.g., strength, frequency, polarization and/or modulation), based on at least one of the comparison (e.g., of the predetermined transmitted GEO satellite signal parameters and the specified received GEO satellite signal parameters), GEO and LEO satellite locations 118, 126 (e.g., at which GEO satellite signal 116 is received by LEO satellite 120) and/or the determined GEO satellite transmission performance at specific geographical location 140, to improve thereby the GEO satellite transmission performance thereof.

Figure 2A:
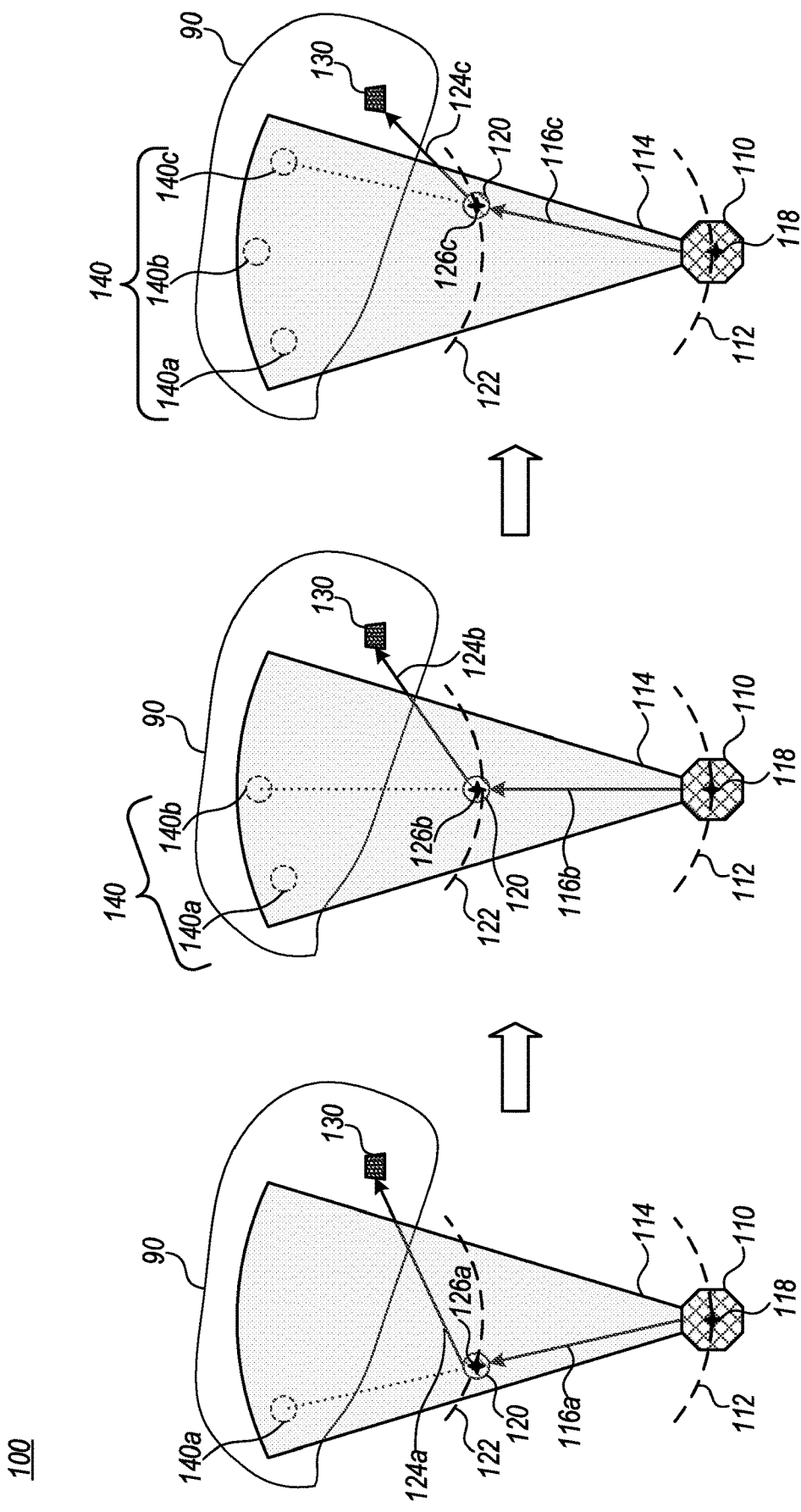
FIG. 2A is a schematic illustration of the system for calibrating an in-orbit satellite (such as GEO satellite) at multiple specific geographic locations on the ground using single additional in-orbit satellite (such as LEO satellite), according to some embodiments of the invention.

Reference is now made to FIG. 2A, which schematically illustrates system 100 for calibrating an in-orbit satellite (such as GEO satellite 110) at multiple specific geographic locations 140 on ground 90 using single additional in-orbit satellite (such as LEO satellite 120), according to some embodiments of the invention.

According to some embodiments, system 100 may be arranged to determine GEO satellite 110 transmission performance and/or to calibrate GEO satellite 110 transmission parameters at multiple specific geographical locations 140 using single LEO satellite 120.

GEO satellite 110 may be arranged to transmit and LEO satellite 120 may be arranged to receive multiple GEO satellite signals 116. Each GEO satellite signal of multiple GEO satellite signals 116 may be received when LEO satellite 120 crosses predetermined transmission footprint 114 of GEO satellite 110 at a predetermined LEO satellite location of corresponding multiple predetermined LEO satellite locations 126.

For example, LEO satellite 120 may be arranged to receive a first GEO satellite signal 116a when it crosses transmission footprint 114 at a first predetermined LEO satellite location 126a, LEO satellite 120 may be arranged to receive a second GEO satellite signal 116b when it crosses transmission footprint 114 at a second predetermined LEO satellite location 126b and/or LEO satellite 120 may be arranged to receive a third GEO satellite signal 116c when it crosses transmission footprint 114 at a third predetermined LEO satellite location 126c.

LEO satellite 120 may be arranged to generate and transmit multiple LEO satellite signals 124. Each LEO satellite signal of multiple LEO satellite signals 124 may comprise corresponding GEO satellite signal of multiple GEO satellite signals 116 received at corresponding predetermined LEO satellite location of multiple predetermined satellite locations 126 (e.g., as described above with respect to FIG. 1A).

For example, a first LEO satellite signal 124a may comprise first GEO satellite signal 116a received at first predetermined location 126a, a second LEO satellite signal 124b may comprise second GEO satellite signal 116b received at second predetermined location 126b and a third LEO satellite signal 124c may comprise third GEO satellite signal 116c received at third predetermined location 126c.

Base station 130 may be arranged to determine GEO satellite transmission performance at multiple specific geographical locations 140. The GEO satellite transmission performance at each specific geographical location of multiple specific geographical locations 140 may be determined based on corresponding GEO satellite signal of multiple GEO satellite signals 116, corresponding LEO satellite signal of multiple LEO satellite signals 124, GEO satellite location 118, corresponding LEO satellite location of multiple LEO satellite locations 126 (e.g., as described above with respect to FIG. 1B).

For example, the GEO satellite transmission performance at a first specific geographic location 140a may be determined based on first GEO satellite signal 116a, first LEO satellite signal 124a, first predetermined LEO satellite location 126a and GEO satellite location 118; the GEO satellite transmission performance at a second specific geographic location 140b may be determined based on second GEO satellite signal 116b, second LEO satellite signal 124b, second predetermined LEO satellite location 126b and GEO satellite location 118; and the GEO satellite transmission performance at a third specific geographic location 140c may be determined based on third GEO satellite signal 116c, third LEO satellite signal 124c, third predetermined LEO satellite location 126c and GEO satellite location 118.

Base station 130 may be further arranged to calibrate GEO satellite transmission parameters at multiple specific geographical locations 140 (e.g., specific geographic locations 140a, 140b, 140c) to improve thereby the GEO satellite transmission performance at the corresponding multiple specific geographical locations thereof. The GEO satellite transmission parameters at each specific geographical location of multiple geographical locations 140 may be determined based on corresponding GEO satellite signal of multiple GEO satellite signals 116, corresponding LEO satellite signal of multiple LEO satellite signals 126, corresponding LEO satellite location of multiple LEO satellite locations 126, GEO satellite location 118 and GEO satellite transmission performance at corresponding specific geographical location of multiple specific geographical locations 140 (e.g., as described above with respect to FIG. 1B).

Figure 2B:
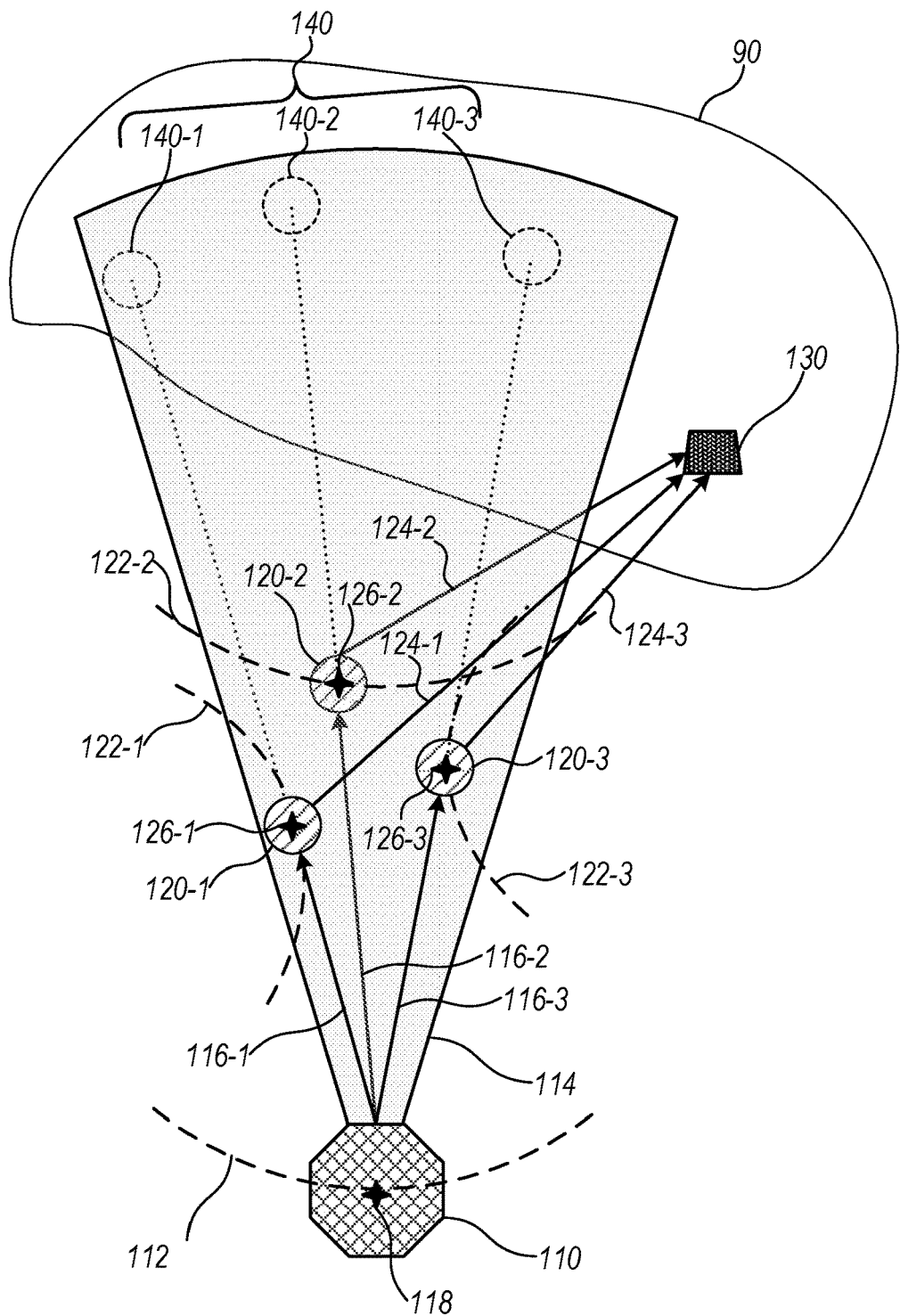
FIG. 2B is a schematic illustration of the system for calibrating an in-orbit satellite (such as GEO satellite) at multiple specific geographic locations at the ground using multiple additional in-orbit satellites (such as LEO satellites), according to some embodiments of the invention.

Reference is now made to FIG. 2B, which schematically illustrates system 100 for calibrating an in-orbit satellite (such as GEO satellite 110) at multiple specific geographic locations 140 on ground 90 using multiple additional in-orbit satellites (such as LEO satellite 120), according to some embodiments of the invention.

According to some embodiments, system 100 may comprise multiple LEO satellites 120 orbiting in corresponding multiple predetermined orbits 122 which cross predetermined footprint 114 of GEO satellite 110. For example, system 100 may comprise a first LEO satellite 120-1 orbiting in a first predetermined orbit 122-1, a second LEO satellite 120-2 orbiting in a second predetermined orbit 122-2 and/or a third LEO satellite 120-3 orbiting in a third predetermined orbit 122-3.

GEO satellite 110 may be arranged to transmit to each LEO satellite of multiple LEO satellites 120 corresponding GEO satellite signal 116. Each LEO satellite of multiple LEO satellites 120 may be arranged to receive corresponding GEO satellite signal 116 when it crosses predetermined transmission footprint 114 of GEO satellite 110 at corresponding predetermined LEO satellite location 126.

For example, first LEO satellite 120-1 may be arranged to receive a first GEO satellite signal 116-1 at a first predetermined LEO satellite location 126-1, second LEO satellite 120-2 may be arranged to receive a second GEO satellite signal 116-2 at a second predetermined LEO satellite location 126-2, and/or third LEO satellite 120-3 may be arranged to receive a first GEO satellite signal 116-3 at a third predetermined LEO satellite location 126-3.

Each of LEO satellites 120 may be arranged to generate and transmit corresponding LEO satellite signal 124 to base station 130. Each of LEO satellites signals 124 may comprise corresponding GEO satellite signal 116 (e.g., as described above with respect to FIG. 1A).

For example, a first LEO satellite signal 124-1 may comprise first GEO satellite signal 116-1 received at first predetermined location 126-1; a second LEO satellite signal 124-2 may comprise second GEO satellite signal 116-2 received at second predetermined location 126-2; a third LEO satellite signal 124-3 may comprise third GEO satellite signal 116-3 received at third predetermined location 126-3.

Base station 130 may be arranged to determine GEO satellite transmission performance at multiple specific geographical locations 140. The GEO satellite transmission performance at each specific geographical location of multiple specific geographical locations 140 may be determined based on corresponding GEO satellite signal 116, corresponding LEO satellite signal 124, GEO satellite location 118 and corresponding LEO satellite location 126 (e.g., as described above with respect to FIG. 1B).

For example, the GEO satellite transmission performance at a first specific geographic location 140-1 may be determined based on first GEO satellite signal 116-1, first LEO satellite signal 124-1, first predetermined LEO satellite location 126-1 and GEO satellite location 118; the GEO satellite transmission performance at a second specific geographic location 140-2 may be determined based on second GEO satellite signal 116-2, second LEO satellite signal 124-2, second predetermined LEO satellite location 126-2 and GEO satellite location 118; and/or the GEO satellite transmission performance at a third specific geographic location 140-3 may be determined based on third GEO satellite signal 116-3, third LEO satellite signal 124-3, third predetermined LEO satellite location 126-3 and GEO satellite location 118.

Base station 130 may be further arranged to calibrate GEO satellite transmission parameters at multiple specific geographical locations 140 (e.g., specific geographic locations 140-1, 140-2, 140-3) to improve thereby the GEO satellite transmission performance at the corresponding multiple specific geographical locations thereof. The transmission parameters at each specific geographical location of multiple specific geographical locations 140 may be determined based on corresponding GEO satellite signal 116, corresponding LEO satellite signal 124, corresponding predetermined LEO satellite location 126, GEO satellite location 118 and/or transmission performance at corresponding specific geographic location 140 (e.g., as described above with respect to FIG. 1B).

In various embodiments, each of LEO satellites 120-1, 120-2, 120-3 may be used to determine GEO satellite transmission performance and/or calibrate GEO satellite transmission parameters at corresponding multiple specific geographical locations 140-1, 140-2, 140-3, respectively (e.g., as described above with respect to FIG. 2A).

In some embodiments, system 100 (e.g., as described above with respect to FIGS. 1-2) may be used to calibrate multiple GEO satellites (e.g., GEO satellite 110).

Figure 3:
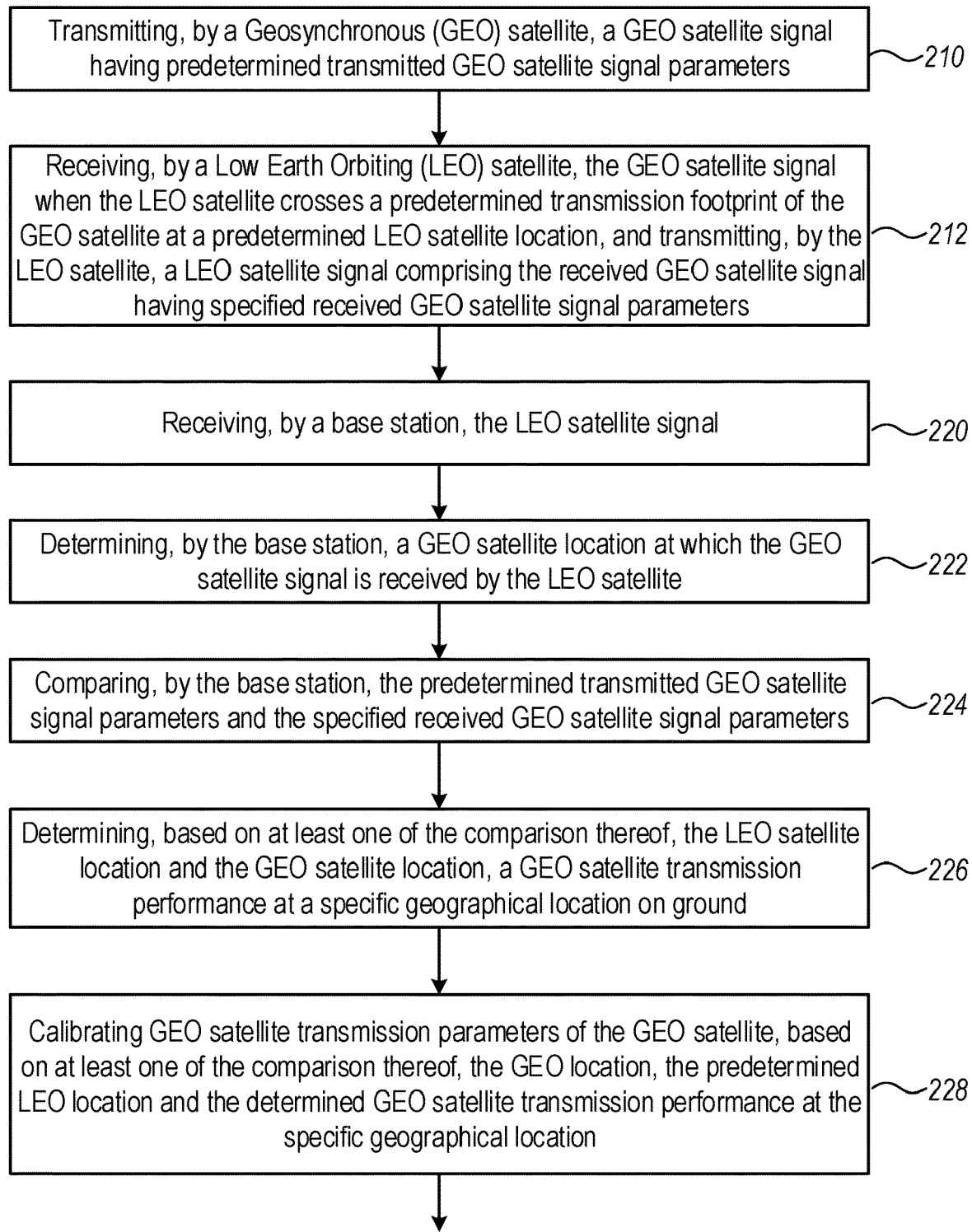
FIG. 3 is a schematic flowchart of a method of calibrating an in-orbit satellite (such as GEO satellite), according to some embodiments of the invention.
Figure 3:
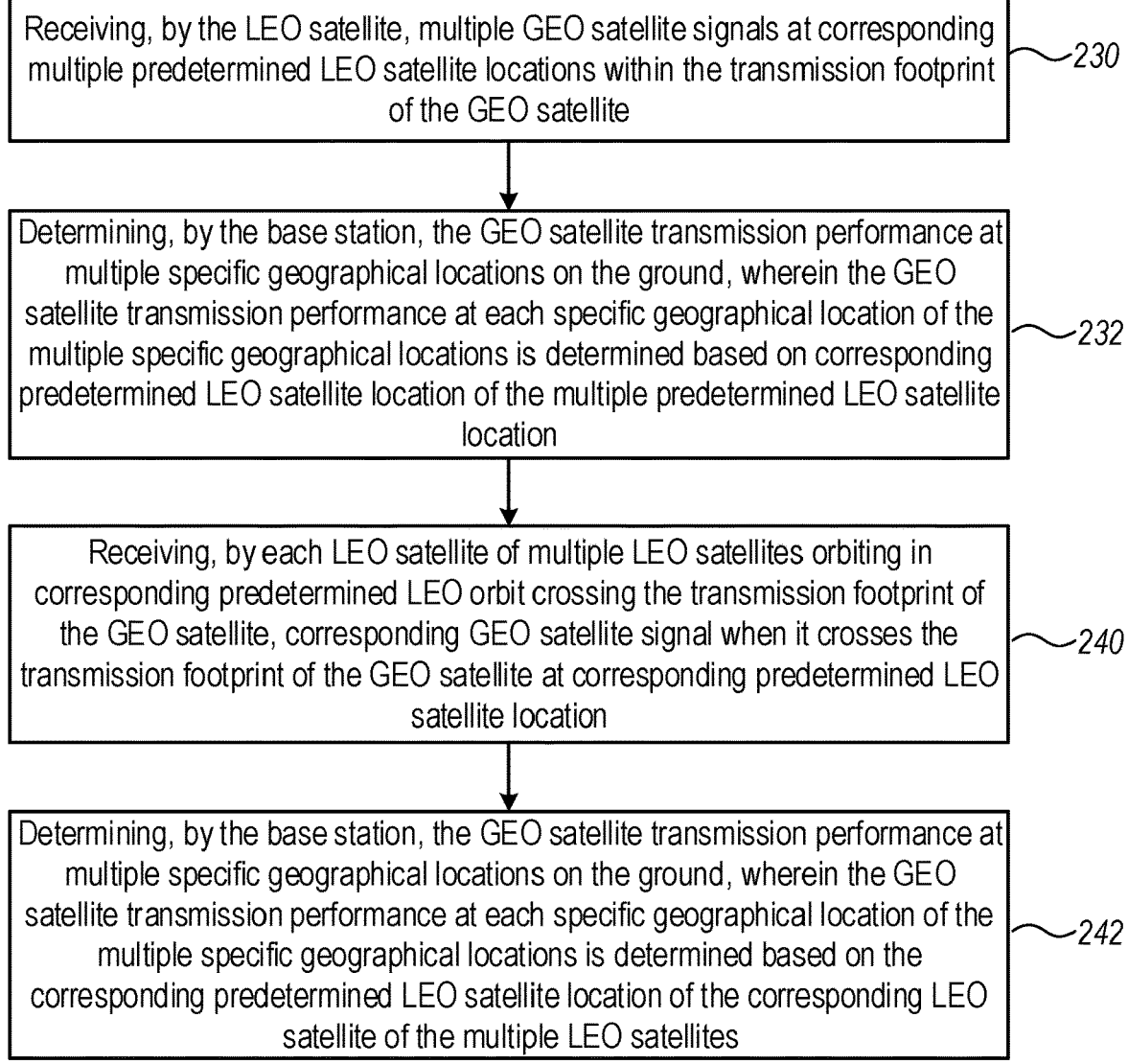

Reference is now made to FIG. 3, which schematically illustrates a flowchart of a method 200 of calibrating an in-orbit satellite (such as GEO satellite 110), according to some embodiments of the invention. Method 200 may be implemented by system 100, which may be configured to implement method 200.

Method 200 may comprise transmitting 210, by a Geosynchronous (GEO) satellite (e.g., GEO satellite 110), a GEO satellite signal (e.g., GEO satellite signal 116) having predetermined transmitted GEO satellite signal parameters. In some embodiments, the predetermined GEO satellite signal parameters may comprise at least one of a strength, frequency, polarization and/or modulation of the signal thereof.

Method 200 may comprise receiving 212, by a Low Earth Orbiting (LEO) satellite (e.g., LEO satellite 120), the GEO satellite signal when the LEO satellite crosses a predetermined transmission footprint of the GEO satellite (e.g., footprint 114) at a predetermined LEO satellite location (e.g., LEO satellite location 126), and transmitting, by the LEO satellite, a LEO satellite signal (e.g., LEO satellite signal 124) comprising the received GEO satellite signal having specified received GEO satellite signal parameters. In some embodiments, the specified received GEO satellite signal parameters may comprise at least one of a strength, frequency, polarization and/or modulation of the signal thereof.

Method 200 may comprise receiving 220, by a base station (e.g., base station 130), the LEO satellite signal comprising the received GEO satellite signal having the specified received GEO satellite signal parameters.

Method 200 may comprise determining 222, by the base station, a GEO satellite location (e.g., GEO satellite location 118) at which the GEO satellite signal is received by the LEO satellite.

Method 200 may comprise comparing 224, by the base station, the predetermined transmitted GEO satellite signal parameters and the specified received GEO satellite signal parameters. In some embodiments, the predetermined transmitted GEO satellite signal parameters may differ from the specified received GEO satellite signal parameters as explained above (e.g., as described above with respect to FIGS. 1A-1B).

Method 200 may comprise determining 226, based on at least one of the comparison thereof, the LEO satellite location and the GEO satellite location, a GEO satellite transmission performance at a specific geographical location on ground (e.g., as described above with respect to FIG. 1B).

Method 200 may comprise calibrating 228 GEO satellite transmission parameters of the GEO satellite, based on at least one of the comparison thereof, the GEO location, the predetermined LEO location and the determined GEO satellite transmission performance at the specific geographical location, to improve thereby the GEO satellite transmission performance at the specific geographical location thereof (e.g., as described above with respect to FIG. 1B).

Method 200 may comprise receiving 230, by the LEO satellite, multiple GEO satellite signals at corresponding multiple predetermined LEO satellite locations within the transmission footprint of the GEO satellite (e.g., as described above with respect to FIG. 2A).

Method 200 may comprise determining 232, by the base station, the GEO satellite transmission performance at multiple specific geographical locations on the ground, wherein the GEO satellite transmission performance at each specific geographical location of the multiple specific geographical locations is determined based on corresponding predetermined LEO satellite location of the multiple predetermined LEO satellite locations (e.g., as described above with respect to FIG. 2A).

Method 200 may comprise receiving 240, by each LEO satellite of multiple LEO satellites orbiting in corresponding predetermined LEO orbit crossing the transmission footprint of the GEO satellite, corresponding GEO satellite signal when it crosses the transmission footprint of the GEO satellite at corresponding predetermined LEO satellite location (e.g., as described above with respect to FIG. 2B).

Method 200 may comprise determining 242, by the base station, the GEO satellite transmission performance at multiple specific geographical locations on the ground, wherein the GEO satellite transmission performance at each specific geographical location of the multiple specific geographical locations is determined based on the corresponding predetermined LEO satellite location of the corresponding LEO satellite of the multiple LEO satellites (e.g., as described above with respect to FIG. 2B).

Advantageously, the disclosed system 100 and method 200 may enable accurate calibration of transmitting in-orbit satellites, such as GEO satellites, using LEO satellites and thereby overcome disadvantages of current calibration systems and methods that are influenced by the atmospheric conditions, and landscape difficult to access (sea, areas that are not accessible, etc.)

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for calibrating an in-orbit satellite, the system comprising:
   a Geosynchronous (GEO) satellite orbiting in a predetermined GEO orbit and having a predetermined transmission footprint, the GEO satellite is arranged to transmit a GEO satellite signal having predetermined transmitted GEO satellite signal parameters;
   a Low Earth Orbiting (LEO) satellite orbiting in a predetermined LEO orbit that crosses the predetermined transmission footprint of the GEO satellite, the LEO satellite is arranged to receive the GEO satellite signal when it crosses the predetermined transmission footprint of the GEO satellite at a predetermined LEO satellite location and to transmit a LEO satellite signal comprising the received GEO satellite signal having specified received GEO satellite signal parameters; and
   a control station arranged to receive the LEO satellite signal from the LEO satellite and comprising a processing unit arranged to:
      determine a GEO satellite location at which the GEO satellite signal is received by the LEO satellite;
      compare the predetermined transmitted GEO satellite signal parameters and the specified received GEO satellite signal parameters; and
      determine, based on at least one of the comparison thereof, the GEO location and the predetermined LEO location, a GEO satellite transmission performance at a specific geographical location on ground.

2. The system of claim 1, wherein the processing unit is further arranged to calibrate GEO satellite transmission parameters of the GEO satellite, based on at least one of the comparison thereof, the GEO location, the predetermined LEO location and the determined GEO satellite transmission performance at the specific geographical location, to improve thereby the GEO satellite transmission performance at the specific geographical location thereof.

3. The system of claim 1, wherein the predetermined transmitted GEO satellite signal parameters and the specified received GEO satellite signal parameters comprising at least one of a strength, frequency, polarization and/or modulation of the signals thereof.

4. The system of claim 1, wherein the LEO satellite is arranged to receive multiple GEO satellite signals at corresponding multiple predetermined LEO satellite locations within the transmission footprint of the GEO satellite.

5. The system of claim 4, wherein the processing unit is further arranged to determine the GEO satellite transmission performance at multiple specific geographical locations on the ground, wherein the GEO satellite transmission performance at each specific geographical location of the multiple specific geographical locations is determined based on corresponding predetermined LEO satellite location of the multiple predetermined LEO satellite locations.

6. The system of claim 1, further comprising multiple LEO satellites orbiting in corresponding multiple LEO orbits crossing the transmission footprint of the GEO satellite.

7. The system of claim 6, wherein each LEO satellite of the multiple LEO satellites is arranged to receive corresponding GEO satellite signal when it crosses the transmission footprint of the GEO satellite at corresponding predetermined LEO satellite location.

8. The system of claim 7, wherein the processing unit is arranged to determine the GEO satellite transmission performance at multiple specific geographical locations on the ground, wherein the GEO satellite transmission performance at each specific geographical location of the multiple specific geographical locations is determined based on the corresponding predetermined LEO satellite location of the corresponding LEO satellite of the multiple LEO satellites.

9. A method of calibrating an in-orbit satellite, the method comprising:
   transmitting, by a Geosynchronous (GEO) satellite, a GEO satellite signal having predetermined transmitted GEO satellite signal parameters;
   receiving, by a Low Earth Orbiting (LEO) satellite, the GEO satellite signal when the LEO satellite crosses a predetermined transmission footprint of the GEO satellite at a predetermined LEO satellite location, and transmitting, by the LEO satellite, a LEO satellite signal comprising the received GEO satellite signal having specified received GEO satellite signal parameters;
   receiving, by a base station, the LEO satellite signal;
   determining, by the base station, a GEO satellite location at which the GEO satellite signal is received by the LEO satellite;

comparing, by the base station, the predetermined transmitted GEO satellite signal parameters and the specified received GEO satellite signal parameters; and determining, based on at least one of the comparison thereof, the LEO satellite location and the GEO satellite location, a GEO satellite transmission performance at a specific geographical location on ground.

10. The method of claim 9, further comprising calibrating GEO satellite transmission parameters of the GEO satellite, based on at least one of the comparison thereof, the GEO location, the predetermined LEO location and the determined GEO satellite transmission performance at the specific geographical location, to improve thereby the GEO satellite transmission performance at the specific geographical location thereof.

11. The method of claim 10, further comprising determining, by the base station, the GEO satellite transmission performance at multiple specific geographical locations on the ground, wherein the GEO satellite transmission performance at each specific geographical location of the multiple specific geographical locations is determined based on corresponding predetermined LEO satellite location of the multiple predetermined LEO satellite locations.

12. The method of claim 9, further comprising receiving, by the LEO satellite, multiple GEO satellite signals at corresponding multiple predetermined LEO satellite locations within the transmission footprint of the GEO satellite.

13. The method of claim 9, further comprising receiving, by each LEO satellite of multiple LEO satellites orbiting in corresponding predetermined LEO orbit crossing the transmission footprint of the GEO satellite, corresponding GEO satellite signal when it crosses the transmission footprint of the GEO satellite at corresponding predetermined LEO satellite location.

14. The method of claim 13, further comprising determining, by the base station, the GEO satellite transmission performance at multiple specific geographical locations on the ground, wherein the GEO satellite transmission performance at each specific geographical location of the multiple specific geographical locations is determined based on the corresponding predetermined LEO satellite location of the corresponding LEO satellite of the multiple LEO satellites.

* * * * *